(12) United States Patent
Chowdhary et al.

(10) Patent No.: US 9,852,550 B2
(45) Date of Patent: Dec. 26, 2017

(54) SYSTEM AND METHOD OF MARKERLESS INJECTION OF ADS IN AR

(71) Applicant: GLOBALIVE XMG JV INC., Toronto (CA)

(72) Inventors: Yousuf Chowdhary, Ontario (CA); Kevin Garland, Ontario (CA); Steven Blumenfeld, Lafayette, CA (US)

(73) Assignee: Civic Resource Group International Inc., Los Angeles, CA (US)

( * ) Notice: Subject to any disclaimer, the term of this patent is extended or adjusted under 35 U.S.C. 154(b) by 0 days.

(21) Appl. No.: 15/229,066

(22) Filed: Aug. 4, 2016

(65) Prior Publication Data

US 2017/0039771 A1     Feb. 9, 2017

Related U.S. Application Data

(60) Provisional application No. 62/201,205, filed on Aug. 5, 2015.

(51) Int. Cl.

| | | |
|---|---|---|
| *G09G 5/00* | (2006.01) | |
| *G06T 19/00* | (2011.01) | |
| *G06T 7/40* | (2017.01) | |
| *G06F 3/01* | (2006.01) | |
| *G06Q 30/02* | (2012.01) | |
| *G06T 7/90* | (2017.01) | |

(52) U.S. Cl.
CPC ............ *G06T 19/006* (2013.01); *G06F 3/016* (2013.01); *G06Q 30/0277* (2013.01); *G06T 7/40* (2013.01); *G06T 7/90* (2017.01); *G06T 2207/30244* (2013.01)

(58) Field of Classification Search
None
See application file for complete search history.

(56) References Cited

U.S. PATENT DOCUMENTS

| | | | |
|---|---|---|---|
| 9,305,361 B2 | 4/2016 | Jiang et al. | |
| 2015/0015608 A1* | 1/2015 | Park | G06T 19/006 345/633 |
| 2015/0161762 A1* | 6/2015 | Fujiwara | G06T 19/006 345/633 |

* cited by examiner

*Primary Examiner* — Xiao Wu
*Assistant Examiner* — Mohammad H Akhavannik
(74) *Attorney, Agent, or Firm* — White and Williams LLP

(57) ABSTRACT

A method is provided for markerless injection of content into an augmented reality scene by use of a mobile device. Through the mobile device, a camera feed of a scene is acquired, which includes a flat surface. A key frame of the flat surface is selected from the feed. After determining that the flat surface in the key frame meets a predetermined level of feature richness, digital content is injected by superimposing text, graphics, video content over at least a part of the key frame. The digital content can be viewed and interacted with by the user of the mobile device. In one embodiment, the digital content is an advertisement.

15 Claims, 4 Drawing Sheets

SYSTEM AND METHOD OF MARKERLESS INJECTION OF ADS IN AR

CROSS-REFERENCE TO RELATED APPLICATION

This application claims the benefit of U.S. Provisional Application No. 62/201,205, filed on Aug. 5, 2015. The contents of the priority application is hereby incorporated by reference in its entirety as if fully set forth herein.

FIELD OF INVENTION

The present invention is related to augmented reality applications in general and more particularly relates to markerless injection of advertisements when encountering a feature rich flat surface in an augmented reality space.

BACKGROUND

Advertising is a form of marketing communication generally used to persuade an audience to partake in a transaction. Commercial ads often seek to generate increased consumption of a company's products or services through "branding", which involves associating a product or company name or image with certain qualities in the minds of consumers.

Any place an "identified" sponsor pays to deliver their message through a medium is advertising. Virtually any medium can be used for advertising. Commercial advertising media can include wall paintings, billboards, street furniture components, printed flyers and rack cards, radio, cinema and television adverts, web banners, mobile telephone screens, shopping carts, web popups, skywriting, bus stop benches, human billboards and forehead advertising, magazines, newspapers, town criers, sides of buses, banners attached to or sides of airplanes, in-flight advertisements on seatback tray tables or overhead storage bins, taxicab doors, roof mounts and passenger screens, musical stage shows, subway platforms and trains, elastic bands on disposable diapers, doors of bathroom stalls, stickers on apples in supermarkets, shopping cart handles, the opening section of streaming audio and video, posters, and the backs of event tickets and supermarket receipts.

On the spectrum between virtual reality, which creates immersive, computer-generated environments, and the real world, augmented reality is closer to the real world. Augmented reality (AR) refers to the addition of a computer-assisted contextual layer of information over the real world, creating a reality that is enhanced or augmented. The basic idea of augmented reality is to superimpose information in the form of data, graphics, audio and other sensory enhancements (haptic feedback and smell) over a real-world environment as it exists in real time. While augmented reality has been in existence for almost three decades, it has only been in the last few years that the technology has become fast enough and affordable enough for the general population to access. Both video games and cell phones are driving the development of augmented reality. Everyone from tourists, to soldiers, to someone looking for the closest subway stop can now benefit from the ability to place computer-generated information and graphics in their field of vision.

Augmented reality systems use video cameras and other sensor modalities to reconstruct a mixed world that is part real and part virtual. Augmented Reality applications blend virtual images generated by a computer with a real image (for example taken from a camera) viewed by a user. There are primarily two types of Augmented Reality implementations, namely Marker-based and Markerless:

Marker-based implementation utilizes some type of image such as a QR/2D code to produce a result when it is sensed by a reader, typically a camera on a mobile device e.g. a Smartphone Markerless AR is often more reliant on the sensors in the device being used such as the GPS location, velocity meter, etc. It may also be referred to as Location-based or Position-based AR.

While Markerless Augmented Reality is emerging many markerless AR applications require the use of a built-in GPS to access content tied to a physical location thus superimposing location-based virtual images over the real-world camera feed. Although these capabilities can allow a user to approach a physical location, see digital content in the digital airspace associated with that physical location, and engage with the digital content; such technologies have serious limitations as built-in GPS devices have limited accuracy, cannot work indoors or underground, and may require that a user be connected to a network via WiFi or 4G.

Many AR applications require specialized equipment for example Google Glasses or other head-mounted displays. Although head-mounted displays, or HMDs, have been around for awhile, they are making a comeback as computing devices shrink in size and have better displays and battery life. But this means that the user has to acquire yet another device. This creates a barrier for the creation and presentation of ads to a common user to engage in an Augmented Reality space.

Augmented Reality is an emerging technology and there are limitless potentials but, as noted above, existing implementations have inherent limitations.

SUMMARY OF THE INVENTION

Broadly speaking, the present invention relates to a markerless Augmented Reality system and method that injects ads into AR space when a feature rich flat surface is detected in the camera feed. This enables a unique and more enjoyable Augmented Reality experience.

A user may first launch an app (either generic or purpose built) that allows the user to interact with the functionality provided by the system. A graphical user interface may be provided for the user to interact with the app features and to personalize the features for individual needs.

Preferably the app has the capability to connect to the internet and also provides an interface which allows the user to log in or out of the system. The application may be specific for a particular mobile device e.g. an iPhone or a Google Android phone, or a tablet computer etc. or generic e.g. Flash or HTML5 based app that can be used in a browser. In one embodiment the app may be downloaded from a branded Application Store.

Users may use connected devices e.g. a Smartphone, a tablet, or a personal computer to connect with the system e.g. using a browser on a personal computer to access the website or via an app on a mobile device. Devices where the invention can be advantageously used may include but are not limited to an iPhone, iPad, Smartphones, Android phones, wearable devices, personal computers e.g. laptops, tablet computers, touch-screen computers running any number of different operating systems e.g. MS Windows, Apple iOS, Linux, Ubuntu, etc.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. Instructions for performing different functions may be included in a computer readable storage medium or other computer program product configured for execution by one or more processors.

In one embodiment the app acquires a key frame of a given flat surface. The key frame acquisition may be automatic or manual with user assistance. A key frame is a single still image in a sequence that occurs at an important point in that sequence. The system determines if the flat surface in the key frame is feature rich, e.g. by using any number of known methods.

The app may then inject a digital ad in place of the flat feature rich surface e.g. superimposing text, graphics, video, audio and other sensory enhancements to create a realistic augmented realty experience for the user for example when a flat brick wall is encountered in an AR space.

Once a digital ad has been injected into the AR space, a user may be able to interact with such content e.g. visit the advertiser's site by virtually touching the ad in the AR space or buying the product/service by virtually touching the ad and optionally paying for it with a digital account e.g. automatically paying from a credit card linked to the user Smartphone, or using Paypal account of the user and the like.

The user may have to provide a user name and a password along with other personal or financial information in order to create an account. Personal information for example may include the user's address, date of birth, gender, sexual orientation, family status and size, tastes, likes and dislikes and other information related to work, habits, hobbies, etc. Financial information may include a credit card or other account number, security data, an expiry date and billing address to be used for financial transactions. The information gathered via such a user account creation and customization may be used for injecting the appropriate ads that fit the user profile. User data may also be linked from data already known about the user, e.g. through the user's social profile.

In addition to interacting with the digital content (e.g. ad content) to get more information or initiate a transaction, user interaction can also consist of manipulating the injected AR digital ad by moving, expanding, contracting, walking through, linking, and changing certain characteristics.

The user may use any one of the several possible mechanisms to interact with the ads injected in the AR space including but not limited to a touchscreen, keyboard, voice commands, eye movements, gamepad, mouse, joystick, wired game controller, wireless remote game controller or other such mechanism.

The ads may be selected based on the user preferences and profile data, such that the injected ads are particularly relevant to the user. For example a young woman with a newborn baby may be shown ads that are related to baby products; while an older woman may be shown ads for vacations to exotic destinations.

In some embodiments the ads may be based on past experience and behavior in addition to the user profile and preferences, e.g. previous buying patterns; or the user's social profile, interaction with social media and friends along with places visited and tagged on a social network like Facebook.

The ads may also be based on the user's browsing history captured via cookies. In some embodiments the system itself may create cookies for storing history specific to the Augmented Reality. Such cookies may maintain a complete or partial record of the state of an object and maintain a record of AR objects (data) that may be used at specific locations amongst other data that may be relevant to an AR experience.

Websites store cookies by automatically storing a text file containing encrypted data on a user's computing device e.g. a Smartphone or a browser the moment the user starts browsing on an online webpage. There are two types of cookies, permanent and temporary cookies. Both have the same capability, which is to create a log/history of the user's online behavior to facilitate future visits to the said website. In cookie profiling, or web profiling cookies are used to collect and create a profile about a user. Collated data may include browsing habits, demographic data, and statistical information amongst other things and is used for targeted marketing. Social networks may use cookies in order to monitor users and may use two kinds of cookies, these two are inserted in the browser when a user signs up, while only one of them is inserted when a user lands on the homepage but does not sign up. Additionally, social networks may use different parameters for logged-in users, logged-off members, and non-members.

According to a first aspect of the invention, a method is provided for markerless injection of content into an augmented reality scene by use of a mobile device. Through the mobile device, a camera feed of a scene is acquired. The scene includes a flat surface. A key frame of the flat surface is selected from the feed. After determining that the flat surface in the key frame meets a predetermined level of feature richness, digital content is injected by superimposing text, graphics, and/or video content over at least a part of the key frame. The digital content can be viewed and interacted with by the user of the mobile device.

The digital content may include an advertisement for a product or service. Interacting with the digital content may include obtaining more information about the product or service, or initiating a purchase.

Interacting with the digital content may include touching or walking-through a corresponding AR space.

The key frame is selected automatically, or it may be selected manually with user assistance. Preferably, the key frame is a still image that occurs at an important point in the feed.

Feature richness may be determined having regard to textural or color contrasts in the key frame. Feature richness may be determined having regard to points, connected regions, or connected curves in the key frame. For example, the features may be examined having regard to invariance to noise, perspective transformations and viewpoint changes, scale, or properties interesting for specific usages.

The steps of selecting a key frame and determining feature richness may be done continuously as the feed is acquired.

The step of injecting digital content may further comprise:
using an optical flow to detect changes in features of the flat surface;
generating a homography matrix;
decomposing the homography matrix into two ambiguous cases;
using knowledge of the normal of the plane to disambiguate the cases and select one correct one; and
calculating a pose estimation for the camera relative to the flat feature rich surface after disambiguation in order to inject the digital content by superimposing it on the flat surface.

Interacting with the digital content may include receiving haptic feedback on the mobile device.

In some embodiments, the digital content may be selected based on at least one of: user data, location data, and social profile data.

The digital content may include audio or other sensory content.

The mobile device may include a wearable component.

DETAILED DESCRIPTION

Methods and arrangements for injecting ads in markerless augmented reality spaces are disclosed in this application whereby when a flat feature rich surface is encountered, an ad is injected into the AR space to partially or totally replace the flat surface.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements. However, it will be understand that, in at least one embodiment, the components comprised in the method and tool are actually implemented in software.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The code is specialized to execute functions described herein which enable a smoother and more efficient technological process.

Figure 1:
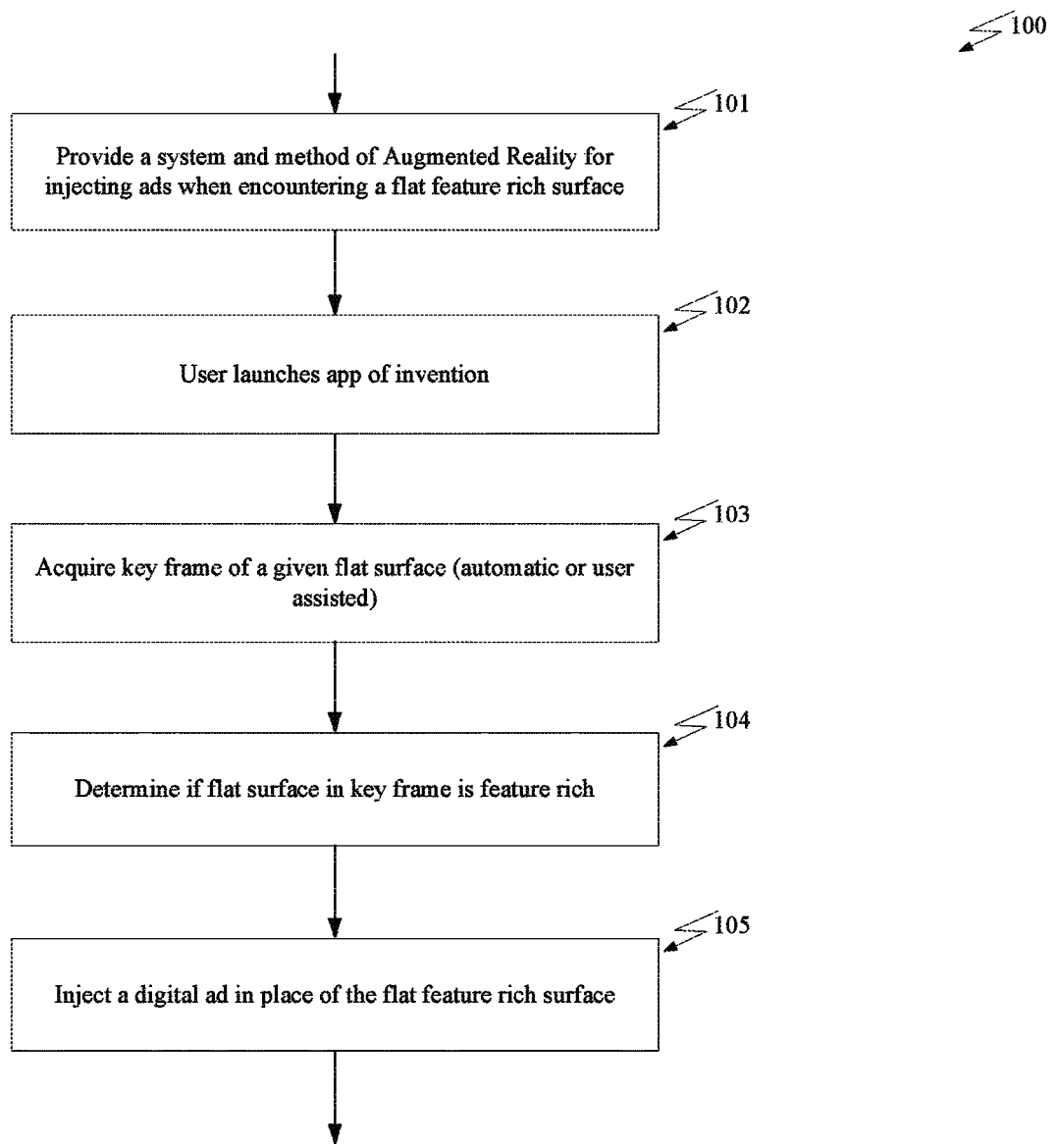
FIG. 1 is a flow diagram of a basic outline of the present method.

FIG. 1 shows a basic flow of the main method 100.

A system and method is provided for injecting ads when encountering a flat feature rich surface in Augmented Reality (AR) space 101.

Preferably, any flat surface with some contrasting features (e.g. contrast of color, or contrast of texture) can be considered a feature rich surface. Thus a smooth black screen may not be considered feature rich as there may not be any contrast between different points of the surface both in terms of color and texture. Whereas a checkered black and white surface may be considered feature rich as there is enough color contrast between the black and white square. Similarly a brick wall or a concrete surface may be similar in color but will have enough texture on the surface to be considered feature rich.

Some examples of feature rich flat surfaces may include but are not limited to a table, a window, a mirror, a brick patio, a wooden fence, a shingled roof, a framed picture, a French door etc. Furthermore any 3 dimensional object that when shot with a single camera may become a 2 dimensional flat surface (as a single camera cannot perceive depth), thus making a soccer ball a flat feature rich surface.

Initially, a user launches an app implementing the invention 102. The application (app) may be either generic or purpose built. It allows the user to interact with the functionality provided by the system. A graphical user interface may be provided for a user to interact with the app features and to personalize them for individual needs.

Preferably the app has the capability to connect to the internet and also provides a user an interface which the user may be able to log in or out of the system.

The application may be specific for a particular mobile device e.g. an iPhone or a Google Android phone, or a tablet computer etc. or generic e.g. Flash or HTML5 based app that can be used in a browser. In one embodiment the app may be downloaded from a branded Application Store.

Users may use connected devices e.g. a Smartphone, a tablet, or a personal computer to connect with the system e.g. using a browser on a personal computer to access the website or via an app on a mobile device. Devices where the invention can be advantageously used may include, but are not limited to, an iPhone, iPad, Smartphones, Android phones, wearable devices, personal computers e.g. laptops, tablet computers, touch-screen computers running any number of different operating systems e.g. MS Windows, Apple iOS, Linux, Ubuntu, etc.

In some embodiments, the device is portable. In some embodiments, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. Instructions for performing different functions may be included in a computer readable storage medium or other computer program product configured for execution by one or more processors.

A key frame of a given flat surface is acquired (automatic or user assisted) 103. A key frame is a single still image in a sequence that occurs at an important point in that sequence e.g. at the start of the sequence, any point when the pose changes etc.

It is determined whether the flat surface in the key frame is feature rich 104.

Provided the surface is sufficiently feature rich, a digital ad is injected in place of the flat feature rich surface 105. In one embodiment the app injects a digital ad in place of the flat feature rich surface e.g. superimpose text, graphics, video, audio and other sensory enhancements to create a realistic augmented realty experience for the user, for example when a flat brick wall is encountered in an AR space.

The user may have to provide a user name and a password along with other personal or financial information in order to create an account. Personal information for example may include providing address, date of birth, gender, sexual orientation, family status and size, tastes, likes and dislikes and other information related to work, habits, hobbies etc. Financial information may include providing a credit card or other account number, security data, an expiry date and billing address to be used for financial transactions. The information gathered via such a user account creation and customization may be used for injecting the appropriate ads that fit the user profile.

Once a digital ad has been injected into the AR space, the user may be able to interact with such content e.g. visit the advertisers site by virtually touching the ad in the AR space or buying the product/service by virtually touching the ad and optionally paying for it with a digital payment method e.g. automatically paying from a credit card linked to the user's Smartphone, or using a PayPal account of the user and the like. Additionally, user interaction can include manipulating the injected AR digital ad by moving, expanding, contracting, walking through, linking, and changing certain characteristics.

The user may use any one of several mechanisms to interact with the ads injected in the AR space including but not limited to a touchscreen, keyboard, voice commands, eye movements, gamepad, mouse, joystick, wired game controller, wireless remote game controller or other such mechanism.

Figure 2:
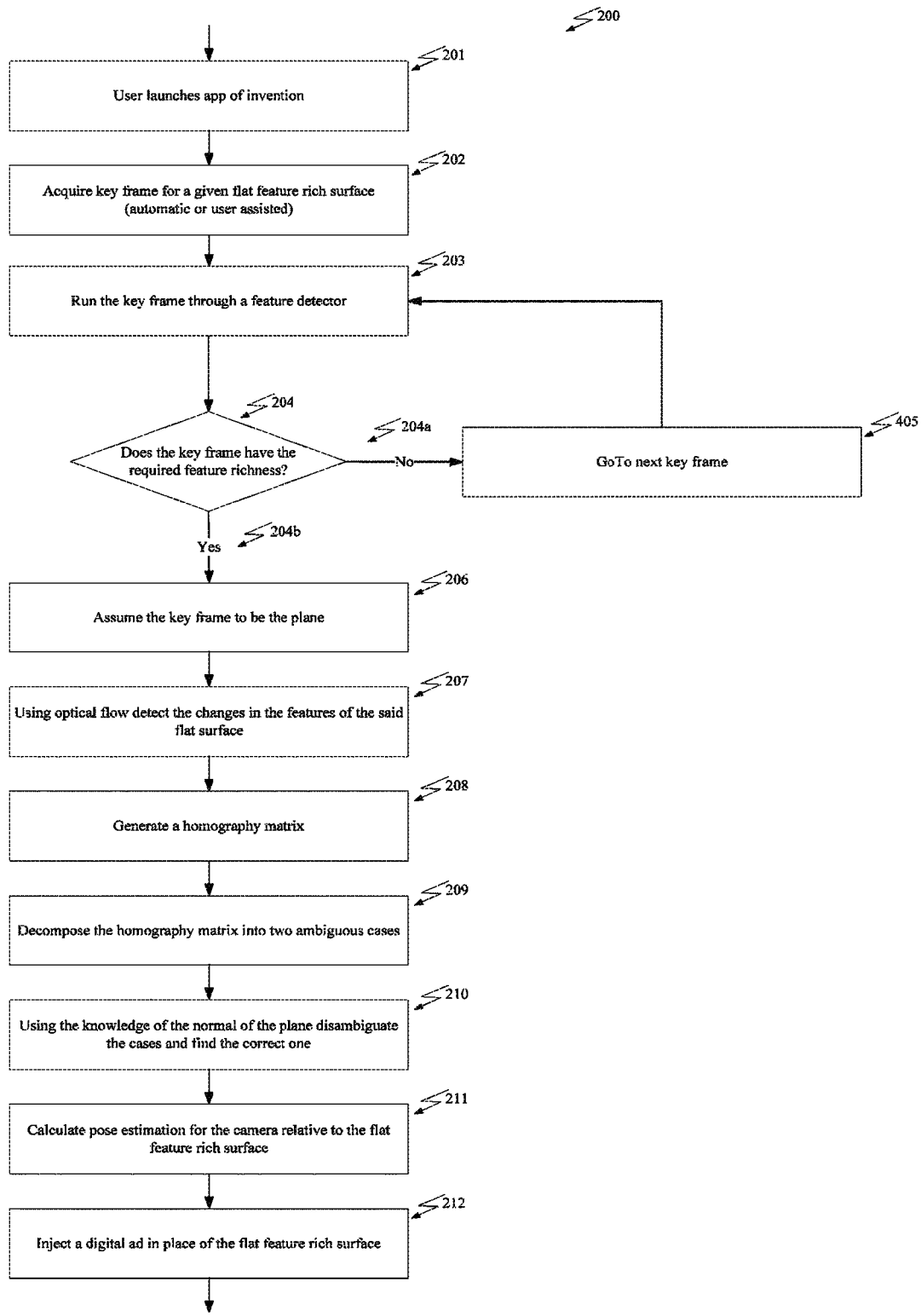
FIG. 2 is a flow diagram with more specific detail as to acquiring a key frame, evaluating feature richness and injecting a digital ad.

Referring now to FIG. 2, a flow chart is provided of pose estimation 200.

The user launches the app 201, e.g. on a Smartphone or a tablet. The app may be downloaded by a user from an AppStore or may come bundled and pre-loaded with the mobile device.

A key frame for a given flat feature rich surface is acquired, either automatically or user assisted 202, e.g. using the camera built into the user's mobile device. A key frame is a single still image in a sequence that occurs at an important point in that sequence.

The key frame is run through a feature detector 203. A feature is defined as an "interesting" part of an image. Features are used as a starting point and are the main primitives for subsequent algorithms for many computer vision algorithms. Feature detection is a process in computer vision that aims to find visual features within the image with particular desirable properties.

In some embodiments the system may use a continuous process. For example, the video stream or a series of stills may be continuously examined and analyzed for acquiring a key frame and then determining if the flat surface in the key frame has the requisite feature richness.

The detected features are some subsection of the key frame and can be points (e.g. Harris corners), connected image regions (e.g. DoG or MSER regions), continuous curves in the image etc. Interesting properties in a key frame can include invariance to noise, perspective transformations and viewpoint changes (camera translation and rotation), scaling (for use in visual feature matching), or properties interesting for specific usages (e.g. visual tracking).

The system determines whether the key frame has the required feature richness 204 as necessitated by a given implementation. If No 204a, the key frame is missing the required features, then the process moves to the next key frame 205. In some embodiments this process may be continuous such that the feature detection process continues until a key frame with specific feature richness is detected.

If Yes 204b, the key frame has the requisite feature richness, then the system assumes the key frame to be the plane 206 comprising the flat surface.

Using optical flow, the system may detect any changes in the features of the said flat surface 207.

The system may generate a homography matrix 208. In the field of computer vision, any two images of the same planar surface in space are related by a homography (assuming a pinhole camera model). Homography is used for image rectification, image registration, or computation of camera motion (rotation and translation) between two images. Two images are related by a homography if and only if:

Both images are viewing the same plane from a different angle

Both images are taken from the same camera but from a different angle

Camera is rotated about its center of projection without any translation

It is important to note that the homography relationship is independent of the scene structure and it does not depend on what the cameras are looking at and the relationship holds regardless of what is seen in the images. A homography is a 3 by 3 matrix M:

$$M = \begin{bmatrix} m_{11} & m_{12} & m_{13} \\ m_{21} & m_{22} & m_{23} \\ m_{31} & m_{32} & m_{33} \end{bmatrix}$$

If the rotation R of a camera and calibration K are known, then homography M can be computed directly. Applying this homography to one image yields the image that would be obtained if the camera was rotated by R.

The homography matrix is decomposed into two ambiguous cases 209. Using the knowledge of the normal of the plane, the cases are disambiguated to find the correct one 210.

The pose estimation is calculated for the camera relative to the flat feature rich surface 211.

A digital ad is injected in place of the flat feature rich surface 212. Once camera rotation and translation have been extracted from an estimated homography matrix, this information may be used for navigation, or to insert models of 3D objects into an image or video, so that they are rendered with the correct perspective and appear to have been part of the original scene.

The ads that are injected are preferably selected to be particularly relevant to the user. For example a young woman with a newborn baby may be shown ads that are related to baby products; while an older woman may be shown ads for vacations to exotic destinations.

The ads selected may be based on:
- past experience and behavior in addition to the user profile and preferences; e.g. previous buying patterns may have an impact on the types of ads that are displayed;
- the user's social profile, interaction with social media and friends along with places visited and tagged on a social network like Facebook;
- browsing history, e.g. browsing patterns or activities captured via cookies. In some embodiments the invention itself may create cookies for storing history specific to the Augmented Reality. Such cookies may maintain a complete or partial record of the state of an object and maintain a record of AR objects (data) that may be used at specific locations amongst other data that may be relevant to an AR experience.

In some embodiments of the invention the ads injected to replace the flat feature rich surfaces may be based on user behaviour e.g. browsing history captured via cookies. Websites store cookies by automatically storing a text file containing encrypted data on a user's computing device e.g. a Smartphone or a browser the moment the user starts browsing on an online webpage. There are two types of cookies, permanent and temporary cookies. Both have the same capability, which is to create a log/history of the user's online behavior to facilitate future visits to the said website. In cookie profiling, or web profiling cookies are used to collect and create a profile about a user. Collated data may include browsing habits, demographic data, and statistical information amongst other things and is used for targeted marketing. Social networks may utilizes cookies in order to monitor its users and may use two kinds of cookies; these two are inserted in the browser when a user signs up, while only one of them is inserted when a user lands on the homepage but does not sign up. Additionally, social networks may use different parameters for logged-in users, logged-off members, and non-members.

While some exemplary advertising methods and schemes have been given, the invention is not limited to these examples, in fact the invention may use any other kind of method for targeted advertising.

Figure 3:
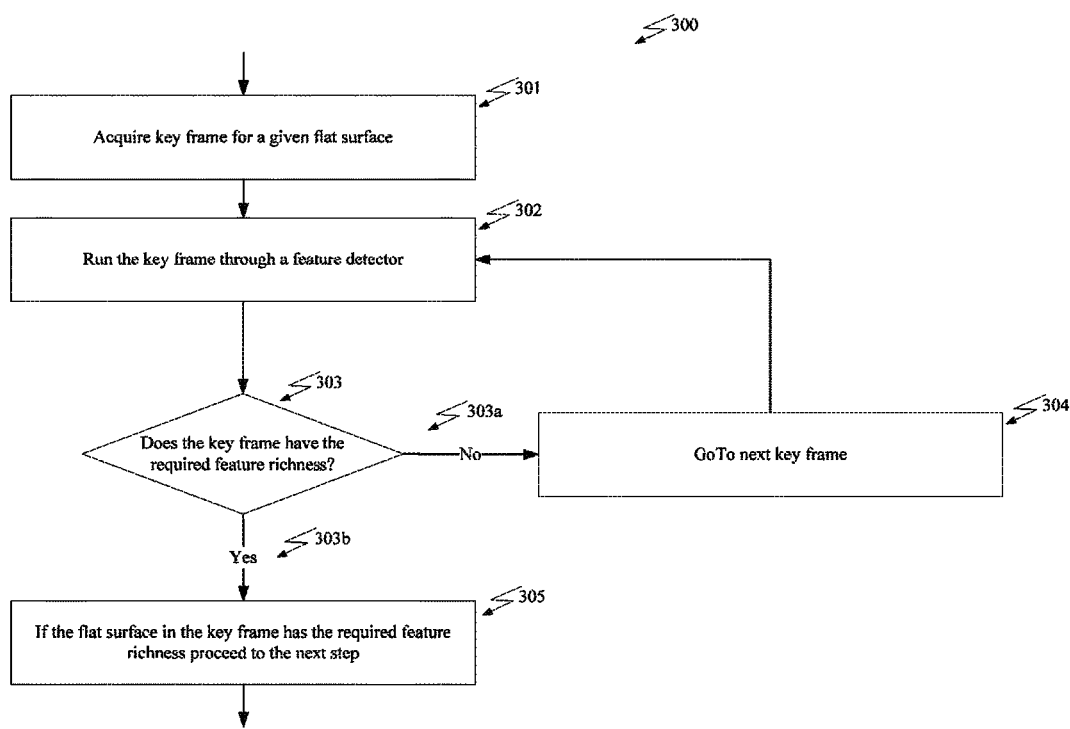
FIG. 3 is a flow diagram with more specific detail as to feature richness evaluation.

Referring to FIG. 3, a flow chart is provided of the process for determining if a flat surface is feature rich 300. A key frame is acquired for a given flat surface 301. A key frame is a single still image in an animated sequence that occurs at an important point in that sequence of images.

The key frame is run through a feature detector 302.

It is determined whether the flat surface in key frame is feature rich 303.

If the flat surface in the key frame has the required feature richness, the system proceeds to the next step 304 of injecting a digital ad in the AR space where the flat feature rich surface is located.

In some embodiments, once a digital ad has been injected into the AR space, a user may be able to interact with the content e.g. visit the advertiser's site by virtually touching the ad in the AR space or buy the product/service by virtually touching the ad and optionally paying for it with a digital payment method e.g. automatically paying from a credit card linked to the user's Smartphone, or using a PayPal account of the user and the like.

Figure 4:
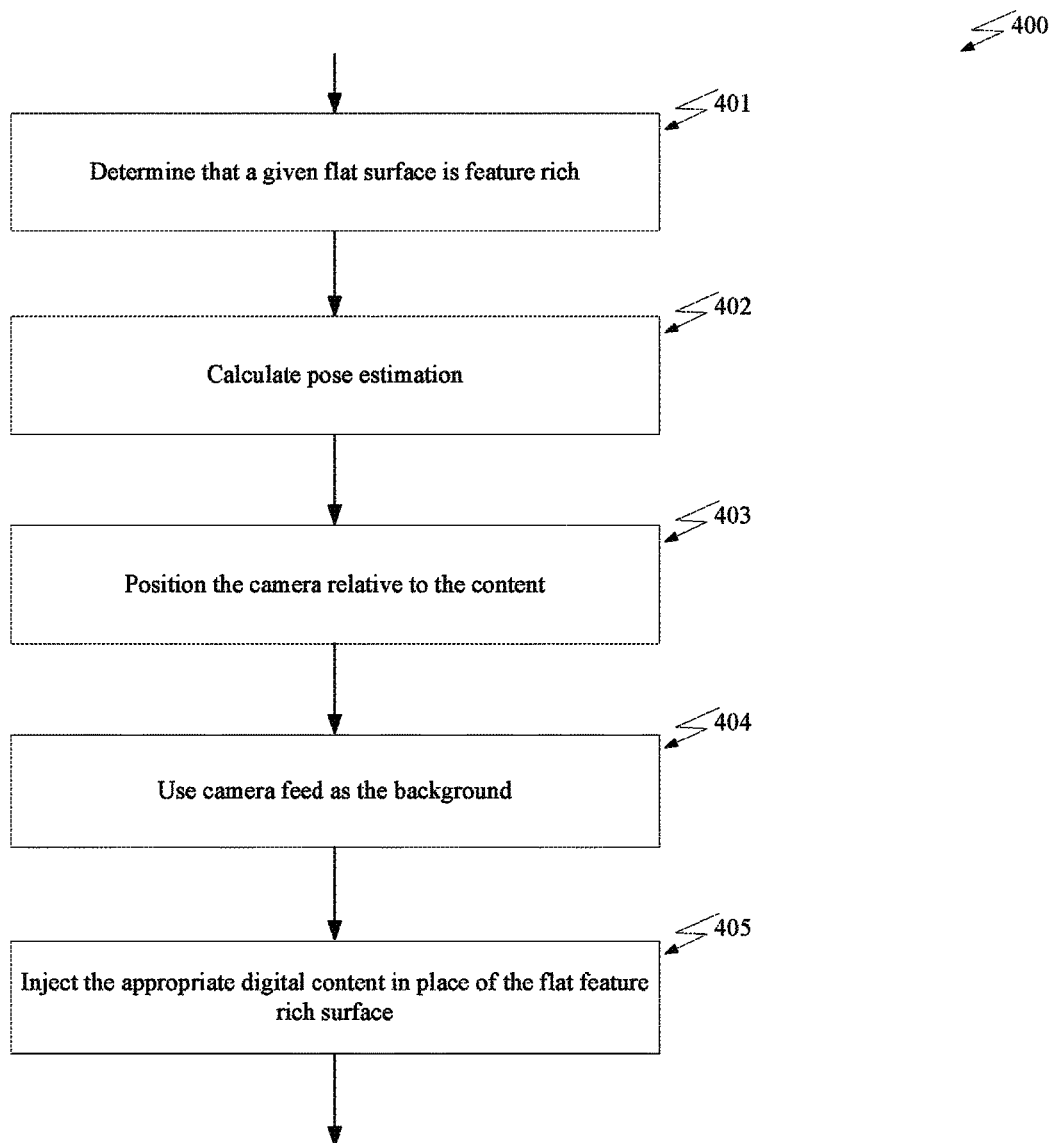
FIG. 4 is a flow diagram with more specific detail as to pose estimation.

Referring to FIG. 4, a flow chart is provided of the process for the injection of digital content in place of the flat feature rich surface in the Augmented Reality space 400.

After it is determine that a given flat surface is feature rich 401, a pose estimation is calculated 402. In computer vision a typical task is to identify specific objects in an image and to determine each object's position and orientation relative to some coordinate system. The combination of position and orientation is referred to as the pose of an object, even though this concept is sometimes used only to describe the orientation. This information can then be used, for example, to allow a computer to manipulate an object or to inject a virtual object into the image in place of the real object in the video steam.

The pose can be described by means of a rotation and translation transformation which brings the object from a reference pose to the observed pose. This rotation transformation can be represented in different ways, e.g., as a rotation matrix or a quaternion.

The specific task of determining the pose of an object in an image (or stereo images, image sequence) is referred to as pose estimation. The pose estimation problem can be solved in different ways depending on the image sensor configuration, and choice of methodology. Three classes of methodologies can be distinguished:

- Analytic or geometric methods: Given that the image sensor (camera) is calibrated the mapping from 3D points in the scene and 2D points in the image is known. If also the geometry of the object is known, it means that the projected image of the object on the camera image is a well-known function of the object's pose. Once a set of control points on the object, typically corners or other feature points, has been identified it is then possible to solve the pose transformation from a set of equations which relate the 3D coordinates of the points with their 2D image coordinates. Algorithms that determine the pose of a point cloud with respect to another point cloud are known as point set registration algorithms, if the correspondences between points are not already known.
- Genetic algorithm methods: If the pose of an object does not have to be computed in real-time a genetic algorithm may be used. This approach is robust especially when the images are not perfectly calibrated. In this particular case, the pose represents the genetic representation, and the error between the projection of the object control points and the image is the fitness function.
- Learning-based methods: These methods use artificial learning-based systems which learn the mapping from 2D image features to pose transformation. This means that a sufficiently large set of images of the flat surface (in different poses) must be presented to the system during a learning phase. Once the learning phase is completed, the system is able to present an estimate of the pose of the flat surface, and digital ads can be inserted in place of the flat feature rich surface with the same pose.

The preferred embodiment may use the analytic or geometric methods for pose estimation, while other embodiments may use different methods best suited to their particular implementations.

The camera is positioned relative to the content 403. Once camera rotation and translation have been extracted from an estimated homography matrix, this information may be used for navigation, or to insert models of 3D objects into an image or video, so that they are rendered with the correct perspective and appear to have been part of the original scene The camera feed is used as the background 404. The appropriate digital content is injected in place of the flat feature rich surface 405. For example, the system may superimpose graphics, video, audio and other sensory enhancements like haptic feedback and smell to create a realistic augmented realty experience for the user.

Tactile haptic feedback has become a commonly implemented technology in mobile devices, and in most cases, this takes the form of vibration response to touch. Haptic technology, haptics, or kinesthetic communication, is tactile feedback technology which recreates the sense of touch by applying forces, vibrations, air or motions to the user. This mechanical stimulation can be used to assist in the creation of virtual objects in a computer simulation, to control such virtual objects, and to enhance the remote control of machines and devices.

In some embodiments ads may be injected in place of 3D objects that can be broken down into multiple flat feature rich surfaces. For example on a 3D object like a box which has 6 flat feature rich surfaces, an ad may be injected for each of the 6 flat surfaces, such that the surface facing the user may be displaying the visible ads. In some embodiments each surface may be replaced with a different ad where the ads may either be related to each other for example different products from the same vendor or same product from different vendors each with a different price point.

In some embodiments ads associated with different brands, companies, promotions etc. may be downloaded (either automatically or by user request) from a central server that acts as a repository for ads.

In other embodiments a user may be paid for viewing these ads or may be provided some other free items in compensation for watching and interacting with the ads injected in the AP space. In yet other embodiments a user may be required to pay when acquiring and interacting with these ads being injected into the AR space.

It should be noted that the size and scope of the digital content on the screen of the device is not limited to a particular portion of a user's field of vision as the digital content comprising the ad may extend throughout the screen of the mobile device or be sectioned to predetermined viewing dimensions, or dimensions in proportion to the size of the screen.

The digital content displayed on the screen of the mobile device being used for the Augmented Reality experience can be anchored to a particular volume of airspace corresponding to a physical location of the flat feature-rich surface. The mobile device being used for the Augmented Reality experience may display some, or all, of the digital content relative the orientation of the user or screen to the physical location of the flat feature rich surface. That is, if a user is oriented towards the physical location of the flat feature rich surface, the digital content may be displayed, but gradually moved and eventually removed as the user moves to become oriented so that the physical location of the flat feature rich surface is not aligned with the user and the screen.

Although the digital content displayed on the screen is not limited to a particular size or position, various embodiments configure the screen of the mobile device being used for the Augmented Reality experience with the capability to render digital content as a variety of different types of media, such as two-dimensional images, three-dimensional images, video, text, executable applications, and customized combinations of the like.

The application is not limited to the cited examples, but the intent is to cover all such areas that may benefit from Augmented Reality to enhance a user experience and provide informative content with which a user can interact.

One embodiment may preferably also provide a framework or an API (Application Programming Interface) that enables a developer to incorporate the functionality of injecting virtual objects/characters/content into an AR space when encountering a flat feature rich surface. Using such a framework or API allows for a more exciting Augmented Reality generation, and eventually allows for more complex and extensive ability to keep a user informed and engaged over a longer duration of time.

It should be understood that although the term app has been used as an example in this disclosure but in essence the term may also imply any other piece of software code where the embodiments of the invention are incorporated. The software application can be implemented in a standalone configuration or in combination with other software programs and is not limited to any particular operating system or programming paradigm described here.

Although AR has been exemplified above with reference to advertising, it should be noted that AR is also associated with many industries and applications. For example, AR can be used in movies, cartoons, computer simulations, and video simulations, among others. All of these industries and applications would benefit from aspects of the present invention.

The examples noted here are for illustrative purposes only and may be extended to other implementation embodiments. While several embodiments are described, there is no intent to limit the disclosure to the embodiment(s) disclosed herein. On the contrary, the intent is to cover all practical alternatives, modifications, and equivalents.

What is claimed is:

1. A method of markerless injection of content into an augmented reality scene by use of a mobile device, comprising:
through the mobile device, acquiring a camera feed of a scene, the scene including a flat surface;
selecting a key frame of the flat surface from the feed;
determining that the flat surface in the key frame meets a predetermined level of feature richness; and
injecting digital content by superimposing text, graphics, video content over at least a part of the key frame, and allowing the digital content to be viewed and interacted with by the user of the mobile device,
wherein injecting digital content further comprises:
using an optical flow to detect changes in features of the flat surface;
generating a homography matrix;
decomposing the homography matrix into two ambiguous cases;
using knowledge of the normal of the plane to disambiguate the cases and select one correct one; and
calculating a pose estimation for the camera relative to the flat feature rich surface after disambiguation in order to inject the digital content by superimposing it on the flat surface.

2. The method of claim 1, wherein the digital content includes an advertisement for a product or service.

3. The method of claim 2, wherein interacting with the digital content includes obtaining more information about the product or service, or initiating a purchase.

4. The method of claim 1, wherein interacting with the digital content includes touching or walking-through a corresponding AR space.

5. The method of claim 1, wherein the key frame is selected automatically.

6. The method of claim 1, wherein the key frame is selected manually with user assistance.

7. The method of claim 1, wherein the key frame is a still image that occurs at an important point in the feed.

8. The method of claim 1, wherein the feature richness is determined having regard to textural or color contrasts in the key frame.

9. The method of claim 1, wherein the feature richness is determined having regard to points, connected regions, or connected curves in the key frame.

10. The method of claim 1, wherein the feature richness is determined having regard to invariance to noise, perspective transformations and viewpoint changes, scale, or properties interesting for specific usages.

11. The method of claim 1, wherein the steps of selecting a key frame and determining feature richness are done continuously as the feed is acquired.

12. The method of claim 1, wherein interacting with the digital content includes receiving haptic feedback on the mobile device.

13. The method of claim 1, wherein the digital content is selected based on at least one of: user data, location data, and social profile data.

14. The method of claim 1, wherein the digital content includes audio or other sensory content.

15. The method of claim 1, wherein the mobile device includes a wearable component.

\* \* \* \* \*